United States Patent [19]
Alcock et al.

[11] 4,190,811
[45] Feb. 26, 1980

[54] LASER CONTROLLED OPTICAL SWITCHING IN SEMICONDUCTORS

[75] Inventors: A. John Alcock; Paul B. Corkum, both of Ottawa; Douglas J. James, Kanata, all of Canada

[73] Assignee: Canadian Patents and Development Limited, Ottawa, Canada

[21] Appl. No.: 850,840

[22] Filed: Nov. 11, 1977

Related U.S. Application Data

[63] Continuation-in-part of Ser. No. 681,586, Apr. 29, 1976, abandoned.

[30] Foreign Application Priority Data

May 22, 1975 [CA] Canada .................................. 227587

[51] Int. Cl.$^2$ ............................................. H01S 3/101
[52] U.S. Cl. .............................. 331/94.5 M; 350/354
[58] Field of Search ................... 331/94.5 M; 350/354

[56] References Cited
U.S. PATENT DOCUMENTS

| | | | |
|---|---|---|---|
| 3,555,455 | 1/1971 | Paine ................. | 331/94.5 M |
| 4,003,631 | 1/1977 | Biet et al. ............ | 331/94.5 M |

OTHER PUBLICATIONS

Sooy et al., Switching of Semiconductor Reflectivity by a Giant Pulse Laser Appl. Phys. Lett., vol. 5, No. 3, (Aug. 1, 1964), pp. 54-56.

*Primary Examiner*—William L. Sikes
*Attorney, Agent, or Firm*—Edward Rymek

[57] ABSTRACT

A method and apparatus for switching an infrared radiation signal laser beam in which a semiconductor, capable of transmitting the signal beam without damage, is provided and upon which the signal beam is incident at an angle which may preferably be Brewster's angle. The surface of the semiconductor is irradiated by a second laser beam which has a sufficiently high frequency to produce free carriers in the semiconductor and which has a sufficient radiation intensity and time duration to produce a free carrier density greater than the critical density for the signal beam resulting in substantially total reflection of the signal beam from the semiconductor surface. In particular, a pulsed $CO_2$ laser beam which is incident on a polycrystalline n-type germanium semiconductor is reflected by irradiating the semiconductor with a pulsed ruby or Nd:glass laser beam.

18 Claims, 11 Drawing Figures

|←—100nsec

|←—10nsec

|←─ 20 nsec.

|←─ 100 nsec.

LASER CONTROLLED OPTICAL SWITCHING IN SEMICONDUCTORS

This application is a continuation-in-part of U.S. application Ser. No. 681,586, filed Apr. 29, 1976 and now abandoned.

This invention is directed to an apparatus for the high speed reflective switching of a beam of infrared laser radiation (signal beam) and in particular to an apparatus in which the optical properties of a semiconductor at the infrared signal beam frequency are switched from a non-reflecting to a reflective state.

Laser radiation can be switched by a number of devices, an example being electro-optic switching using the Pockels or Kerr effect. In many cases such switches have serious limitations, particularly at far infrared wavelengths (e.g. 10 μm) where the maximum usable apertures are presently restricted to diameters of ~2.0 cm.

Laser radiation may also be switched off by rendering a semiconductor opaque to the radiation. This technique is described in U.S. Pat. No. 3,555,455 which issued on Jan. 21, 1971 to Paine, and in U.S. Pat. No. 4,003,631 which issued on Jan. 18, 1977 to Biet et al.

Studies such as those reported in the Applied Physics Letters, Volume 5, Number 3, on pages 54–56, by W. R. Sooy et al, and entitled "Switching of Semiconductor Reflectivity by a Giant Pulse Laser", and in JETP Letters, Volume 7, Number 3, on pages 69–72, by G. N. Galkin et al and entitled "Plasma Resonance on Nonequilibrium Carriers in Semiconductors", have been carried out and demonstrate that due to the production of free carriers in a semiconductor, partial switching of radiation by reflection may be achieved. Although such studies have demonstrated partial switching action, a useful device requires substantially total switching of a signal beam in a controlled manner without the occurrence of damage in the switching element.

It is therefore an object of this invention to provide an apparatus for the reflective switching of an infrared laser beam in a controlled manner.

It is a further object of this invention to provide an apparatus for switching a large aperture, high power infrared laser beam by reflecting the laser beam.

It is another object of this invention to provide an apparatus for the reflective switching of a high power infrared laser beam on a time scale corresponding to the pulse duration of a controlling beam.

It is a further object of this invention to provide an apparatus which will allow the synchronization of the outputs of two mode-locked or short pulse lasers of different frequency.

It is another object of this invention to provide an apparatus which will allow the generation of ultrashort (<100 psec) infrared pulses.

These and other objects are achieved by a method and apparatus in which a semiconductor that is normally transparent to the radiation of an infrared signal beam is provided, and upon which the infrared signal beam is incident at an angle which may preferably be Brewster's angle. The surface of the semiconductor is also irradiated by a second laser beam which has a radiation frequency that is sufficiently high to produce free carriers in the semiconductor, and which has sufficient radiation intensity and time duration to produce a free carrier density greater than the critical density for the signal beam resulting in substantially complete reflection of the signal beam from the semiconductor surface.

Figure 1:
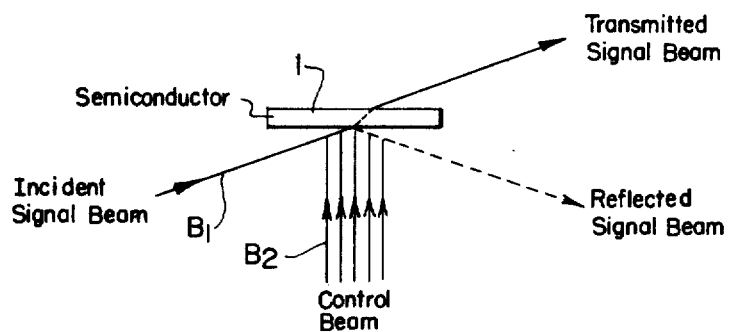
FIG. 1 illustrates the principle of the present invention.

As illustrated in FIG. 1, a signal laser beam $B_1$ having a predetermined infrared radiation frequency is directed obliquely onto the surface of a polished semiconductor 1 which is capable of transmitting essentially all of the signal beam without damage, even though the signal beam is a high power beam resulting in a radiation intensity greater than 1 $MW/cm^2$ at the semiconductor surface. A second, control laser beam $B_2$, having a higher radiation frequency is used to irradiate the surface of the semiconductor 1 which causes the beam $B_1$ to be reflected by the semiconductor 1. The frequency of the control beam laser and the optical properties of the semiconductor are such that free carriers are created without damage to the semiconductor. In addition, the control beam requires sufficient radiation intensity and time duration to produce a free carrier density greater than the critical density for the infrared signal beam resulting in substantially total reflection of the signal beam from the semiconductor surface. The critical density being the density of free carriers at which the plasma frequency equals the frequency of the signal beam radiation.

The semiconductor in the unswitched state must be sufficiently transparent to the signal beam that thermal damage does not occur. In the case of low signal laser powers the semiconductor may be opaque for reflection switching applications.

Although switching action will occur for any angle of incidence of the signal beam, the maximum contrast ratio (defined as the ratio of reflected power on switching to reflected power before switching) is achieved by using a plane polarized signal beam incident on the semiconductor at Brewster's angle.

Figure 2:
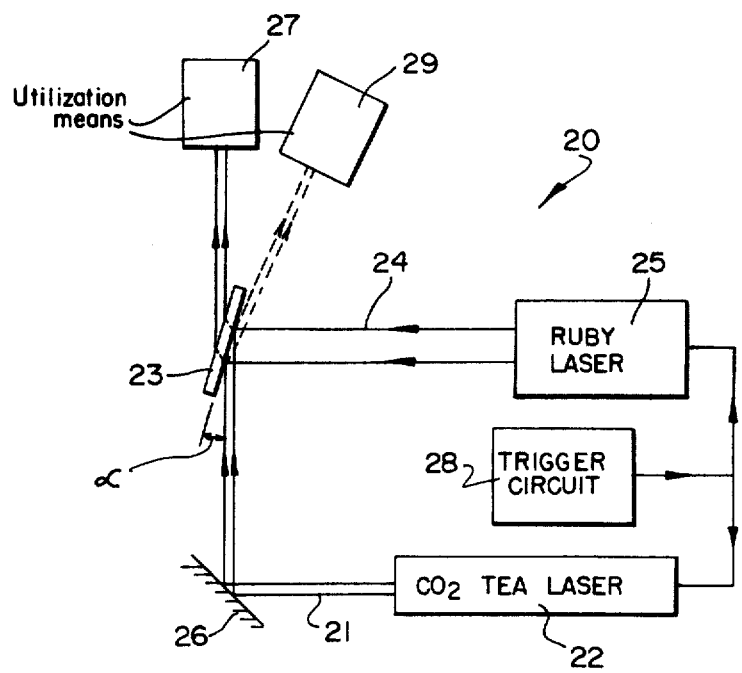
FIG. 2 is a schematic of one embodiment of the invention using a ruby control laser.
Figure 3A:
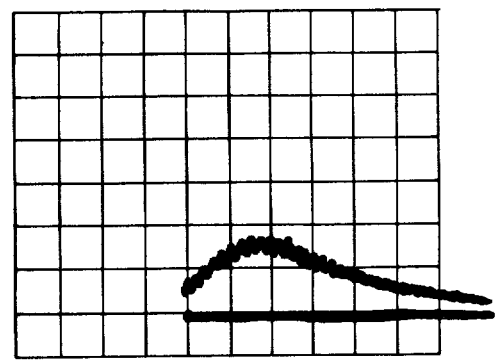
FIG. 3 shows typical pulse shapes of (a) the incident signal beam, (b) the control beam, (c) the transmitted signal beam, and (d) the reflected signal beam for the embodiment of FIG. 2.
Figure 3B:
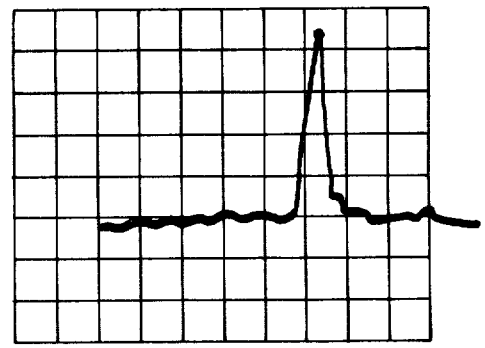
Figure 3C:
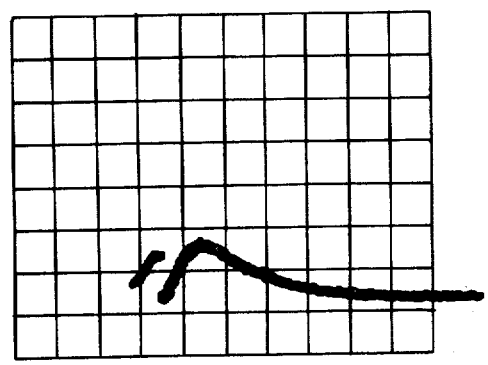
Figure 3D:
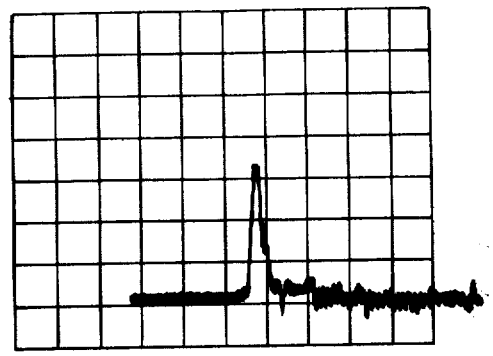

One embodiment of the laser beam switching apparatus is illustrated in FIG. 2. A signal beam 21, generated by a TEA $CO_2$ laser 22 is switched using a control beam 24 from a ruby laser 25.

The signal beam 21 is directed to the polished surface of a polycrystalline n-type germanium semiconductor 23 at Brewster's angle by means of a mirror 26. Laser 22, triggered by trigger circuit 28, generates a plane polarized pulse of 10.6 μm radiation having a duration of 200 nsecs and an intensity of 10 $MW/cm^2$. Approximately 0.3% of the power in the signal beam 21 is reflected by semiconductor 23. The remainder is transmitted through the semiconductor 23 to a utilization means 27. To switch the semiconductor 23 to a reflective state, a ruby laser 25 which is also triggered by trigger circuit 28, provides a control beam 24 with a pulse duration of ~2 nsec that is used to irradiate the semiconductor 23 surface. Substantially total reflection of beam 21 to a utilization means 29 is achieved when the control beam 24 intensity is sufficiently high (10–20 MW/cm$^2$) to produce a free carrier density greater than the critical density for the signal beam.

In addition, the risetime of the reflectivity corresponds closely to that of the control beam 24 pulse, while the decay time depends on the control beam 24 intensity and is typically twice the control beam 24 pulse duration for powers at which substantially complete reflection is achieved. Further the signal beam 21 is cut off in a time of the order of the risetime of the control beam 24 pulse and the transmission recovery time is 10–20 nsec at low fluxes, and increases considerably at higher control beam intensities. FIG. 3 shows typical pulse shapes for the incident signal beam (a), control beam (b), transmitted signal beam (c), and reflected signal beam (d).

Figure 4:
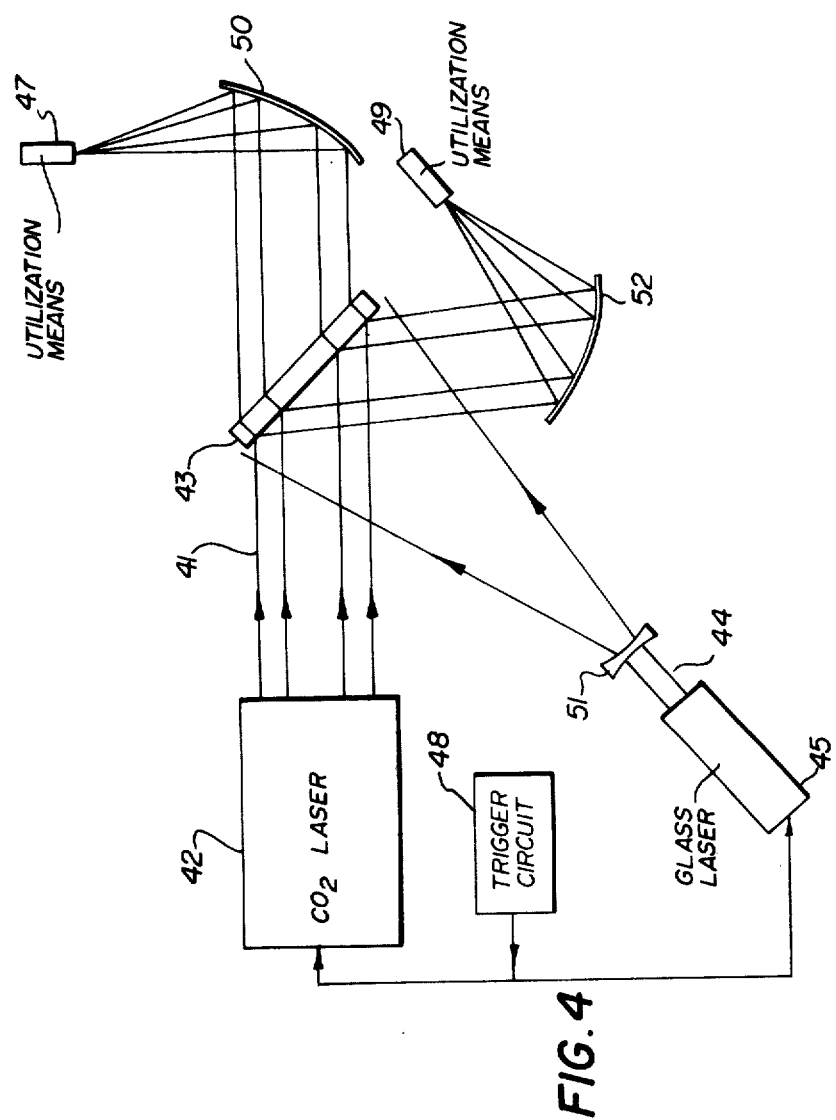
FIG. 4 is a schematic of a second embodiment of the invention using a No: glass control laser.
Figure 5A:
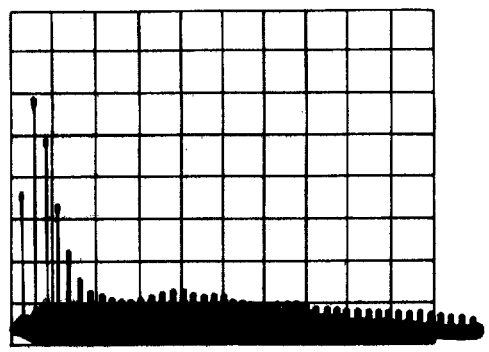
FIG. 5 shows typical pulse shapes of (a) the incident signal beam, (b) the control beam, (c) the reflected signal beam, and (d) the transmitted signal beam for the embodiment in FIG. 4.

A second embodiment of the laser switching apparatus is illustrated in FIG. 4. The signal beam 41 is generated by an injection mode-locked $CO_2$ laser 42 which produces a 10 μm beam 41 consisting of a single train of mode-locked pulses having a total energy of 50 joules. Each pulse in the mode-locked train has a duration of ~1 ns and the pulses are separated by ~12.5 ns as shown in FIG. 5a. The beam 41 is directed onto the surface of a polished polycrystalline germanium semiconductor 43 at Brewster's angle. In the present embodiment, the diameter of the beam is ~5 cm at the surface of the germanium 43. The power in the signal beam 41 is transmitted through the semiconductor 43 and focussed onto a utilization means by a concave mirror 50.

Figure 5B:
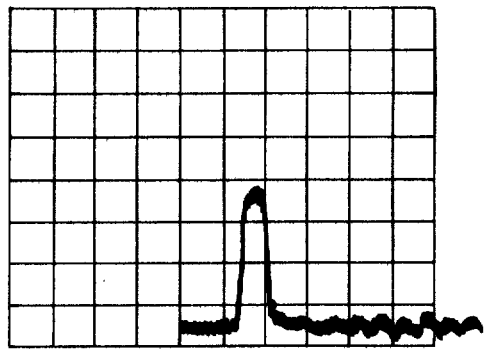
Figure 5C:
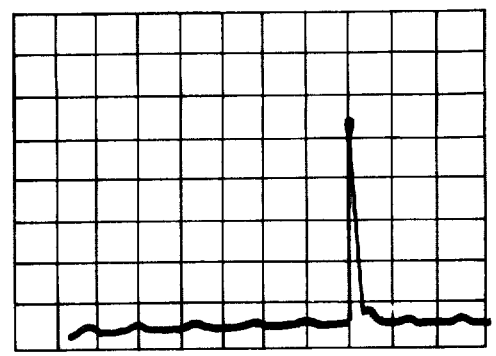
Figure 5D:
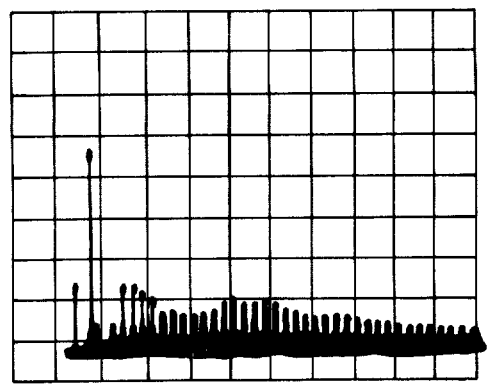

To switch the semiconductor 43 to a reflective state, a neodymium glass laser 45, which may be an Nd: YAG—Nd: glass oscillator-amplifier laser system, produces a control beam 44 consisting of a 3 ns pulse of 1.06 μm radiation having a maximum energy of $\geq 10$ joules as shown in FIG. 5b. The beam 44, having an output diameter of 2 cm, is made divergent by a negative glass lens 51 so as to irradiate the entire surface of the semiconductor 43. The angle of incidence of control beam 44 onto the semiconductor 43 is not critical, however in most cases the optimum angle of incidence is Brewster's angle. The signal laser 42 and the control laser 45 are synchronized by a trigger circuit 48. The reflection intensity of beam 41 which is focussed onto a utilization means 49 by a mirror 52, is greater than 90% of the incident intensity when the control beam 44 power density of ~5 MW/cm$^2$ is incident on the semiconductor 43 as shown in FIG. 5c, with no after pulses in the reflected signal. The transmission of the semiconductor 43 falls to zero for the fully reflected pulse and because of free carrier absorption does not recover completely for at least three succeeding pulses as shown in FIG. 5d. The time required for the recovery of transmission through the semiconductor 43 is determined by the total number of carriers produced by the laser 45 radiation, the intensity of the radiation from laser 42, and the recombination time for the plasma.

Although a number of processes can result in damage to the germanium semiconductor 43 if the absorbed energy density for laser 42 is sufficiently high, when the intensity of the pulses succeeding the switched-out pulse is maintained below 100 MW/cm$^2$ at the germanium semiconductor 43 surface, no damage occurs. With the embodiment in FIG. 4, a maximum energy in the range of 1-2 joules for single nanosecond pulses reflected at the semiconductor 43 surface, was achieved, however it appears that the same technique could yield switched-out pulses of considerably higher energy.

Since the beam switching apparatus in accordance with this invention is capable of substantially total reflection of the signal beam, it may have many uses including the following:

(a) a reflection switch for the selection of a single mode-locked laser pulse;
(b) a reflection switch for gating or selecting a portion of a long laser pulse or continuous laser output;
(c) an intra-cavity reflection switch for P.T.M. (pulse transmission-mode) operation of a long pulse or mode-locked oscillator;
(d) a reflection modulator for C.W. or pulsed lasers;
(e) a variable reflection pulse-shaper for the production of shaped pulses for laser-fusion experiments;
(f) a synchronous active mode-locker based on intra-cavity reflection modulation by an auxiliary mode-locked laser operating at higher frequency;
(g) an ultra-fast sampling gate for the measurement of subnanosecond laser pulses;
(h) an optical isolator for the suppression of target back reflection and decoupling of amplifier stages in high gain oscillator amplifier systems;
(i) a spectral broadening switch for the generation of ultra-short pulses by means of optical filtering; and
(j) an ultra-fast reflection switch for high speed photography at infrared wavelengths.

What is claimed is:

1. An apparatus for switching a signal laser beam having a predetermined infrared radiation frequency comprising:
   semiconductor means normally transparent to infrared radiation of the signal beam frequency;
   signal laser means for providing the infrared radiation signal beam and for directing said signal beam obliquely at a predetermined angle onto the surface of said semiconductor means; and
   control laser means for providing a control beam for irradiating the surface of said semiconductor means, said control laser means beam having a radiation frequency sufficiently high to produce free carriers in said semiconductor means and having sufficient radiation intensity and time duration to produce a free carrier density greater than the critical density for the signal beam resulting in substantially complete reflection of the signal beam from said semiconductor means surface.

2. An apparatus as claimed in claim 1 wherein said signal laser means includes means for directing said signal beam onto the surface of said semiconductor means at Brewster's angle.

3. An apparatus as claimed in claim 2 wherein said signal laser means provides a plane-polarized infrared radiation signal beam.

4. An apparatus as claimed in claim 1 wherein said signal laser means provides a pulsed signal beam and said control laser means provides a pulsed control beam, and the apparatus further includes triggering means for synchronizing said signal laser means and said control laser means.

5. An apparatus as claimed in claim 4 wherein said control laser means provides a pulsed control beam having a duration smaller than 3 nanoseconds.

6. An apparatus as claimed in claim 1 wherein said signal laser means provides a radiation intensity greater than 1 MW/cm$^2$ at the semiconductor surface.

7. An apparatus as claimed in claim 1 wherein said signal laser means is a $CO_2$ laser, said control laser means is a ruby laser and said semiconductor means is a polished polycrystalline n-type germanium semiconductor.

8. An apparatus as claimed in claim 1 wherein said signal laser means is a $CO_2$ laser, said control laser means is a neodymium glass laser and said semiconductor means is a polished polycrystalline n-type germanium semiconductor.

9. An apparatus for switching a signal laser beam having a predetermined infrared radiation frequency comprising:
   semiconductor means normally transparent to said infrared radiation signal laser beam;
   means for directing the infrared radiation signal beam obliquely onto the surface of said semiconductor means; and
   control laser means for providing a control beam for irradiating the surface of said semiconductor means, said control laser means beam having a radiation frequency sufficiently high to produce free carriers in said semiconductor means and having sufficient radiation intensity and time duration to produce a free carrier density resulting in substantially complete reflection of the signal beam from said semiconductor surface.

10. Apparatus as claimed in claim 9 wherein said control laser means provides a pulsed control beam.

11. Apparatus as claimed in claim 10 wherein said control laser means provides a pulsed control beam having a duration smaller than 3 nanoseconds.

12. Apparatus as claimed in claim 9 wherein the signal beam directing means directs the signal beam onto the surface of said semiconductor means at Brewster's angle.

13. An apparatus as claimed in claim 9 wherein said control laser means is a ruby laser and said semiconductor means is a polished polycrystalline n-type germanium semiconductor.

14. An apparatus as claimed in claim 9 wherein said control laser means is a neodymium glass laser and said semiconductor means is a polished polycrystalline n-type germanium semiconductor.

15. A method of switching a signal laser beam having a predetermined infrared radiation frequency comprising:
   directing the infrared radiation signal laser beam obliquely at a predetermined angle onto the surface of a semiconductor normally transparent to said signal laser beam; and
   irradiating the semiconductor surface with a control laser beam having a radiation frequency sufficiently high to produce free carriers in said semiconductor and having sufficient radiation intensity and time duration to produce a free carrier density greater than the critical density for the signal beam for producing substantially complete reflection of the signal beam from said semiconductor surface.

16. A method as claimed in claim 15 which further includes the step of:
   controlling the control laser to provide a pulsed control laser beam.

17. A method as claimed in claim 16 which further includes the step of:
   controlling the control laser to provide a pulsed control beam having a duration smaller than 3 nanoseconds.

18. A method as claimed in claim 15 which further includes the steps of:
   plane polarizing the signal beam; and
   directing the signal beam onto the semiconductor surface at Brewster's angle.

* * * * *